United States Patent [19]

Johansson

[11] 4,113,542

[45] Sep. 12, 1978

[54] METHOD OF JOINING WOOD PRODUCTS

[75] Inventor: Ingvar Johansson, Spanga, Sweden

[73] Assignee: Svenska Traforskningsinstitutet, Stockholm, Sweden

[21] Appl. No.: 822,517

[22] Filed: Aug. 8, 1977

Related U.S. Application Data

[63] Continuation of Ser. No. 692,950, Jun. 4, 1976, abandoned.

[30] Foreign Application Priority Data

Jun. 13, 1975 [SE] Sweden ............................... 7506833

[51] Int. Cl.$^2$ ............................ C09J 3/28; C09J 3/16
[52] U.S. Cl. ................................................. 156/335
[58] Field of Search ....................... 260/17.5; 156/335

[56] References Cited

U.S. PATENT DOCUMENTS

| | | | |
|---|---|---|---|
| 2,159,411 | 5/1939 | Wallace | 260/17.5 |
| 2,259,455 | 10/1944 | Caro et al. | 260/49 |
| 2,282,518 | 5/1942 | Hochwalt et al. | 260/53 |
| 3,096,226 | 7/1963 | Spilker | 156/335 |
| 3,677,884 | 7/1972 | Bornstein | 161/262 |
| 3,931,072 | 1/1976 | Coyle | 260/17.5 |

*Primary Examiner*—Harold D. Anderson
*Assistant Examiner*—E. A. Nielsen
*Attorney, Agent, or Firm*—Oldham, Oldham, Hudak & Weber Co.

[57] ABSTRACT

A synthetic resin product which may be used for gluing wood products and the like comprises a lignin and a low molecular weight liquid which is capable of penetrating, swelling and reacting with the lignin to form a hardened product. The low molecular weight liquid may be a solution consisting essentially of formaldehyde and phenol and may also contain an acid or alkaline hardener. Examples of acid hardeners include ammonium chloride, paratoluene sulphonic acid and the like, whereas examples of an alkaline hardener include sodium carbonate, sodium hydroxide, ammonium hydroxide and the like. The formed resin product is very suitable as an adhesive and utilizes lignin not ordinarily suitable as an adhesive and generally regarded as a waste material.

10 Claims, No Drawings

METHOD OF JOINING WOOD PRODUCTS

This is a continuation of application Ser. No. 692,950, filed June 4, 1976, now abandoned.

The present invention relates to a novel method of treating lignin, primarily lignin obtained from cellulose industrial waste liquors, lignosulphonates and sulphate lignin to enable said lignin to be used as a synthetic resin, particularly as a binding agent in the manufacture, for example, of chipboard and plywood.

Lignin can be said to be the natural adhesive substance in wood and consequently it is not surprising that lignin in different forms has been tested as a binding agent in wood-based products of different types.

Lignin in the form of lignosulphonic acids, most often in the form of sulphite liquor which has been modified to a greater or lesser degree, has been tested, for example, in the so-called Pedersen Process Danish Patent No. 100,984). According to this method, which provides weather-resistant chipboard of very high quality, the pH of the liquor is lowered with an acid, whereafter the liquor is sprayed on the chips. Curing is effected in two stages, first hot pressing and then hardening for a relatively long period of time (1 - 2 hours) in an autoclave. The process is thus complicated and time-consuming when carried out on an industrial scale. The acidity of the binder also creates serious corrosion problems. A similar process which utilises the acidification of sulphite liquor is described in Forest Products Journal 24 (1975) 2, 38. According to this process, which is applied in the manufacture of so-called wafer-board, the chip material is first sprayed with a 15 to 20% sulphuric acid solution. The acidified chip material is then admixed with sulphite waste liquor powder. The process is said to afford an economical advantage and to impart good mechanical strength to the board material, although the acidity of the material (pH approx. equal to 2.5) means that the process and the material, from the aspect of corrosion, and the long-term properties of the material must be held in serious doubt.

A large number of methods for modifying lignin so that it is more suitable for use as an adhesive has been tested and patents applied for.

The German Patent Specification No. 1,223,534 proposes the admixture of melamine-formaldehyde resins, while Roffael and Rauch (Holzforschung 25 (1971) 5, 149 and 26 (1972) 6, 197) proposes the admixture of different forms of phenol resins. The disadvantage with these methods, which provide high quality board, is that large quantities of synthetic resin are still required in order to obtain material properties equal to those which would be obtained solely with synthetic resins. What has been achieved is that approximately 25% of the synthetic resin has been replaced with lignosulphonic acids with no appreciable adverse effect on the properties of the material.

Lignin has also been used as a replacement for phenol in the manufacture of phenol resins to a greater or lesser extent. In this case the ability of the lignin, similar to that of phenol, of reacting with formaldehyde has been utilised. In this way there is obtained a copolymer of lignin-phenol-formaldehyde which can be used as an adhesive.

According to U.S. Pat. No. 3,597,375 lignosulphonate is first reacted with phenol under alkaline conditions, whereafter the reaction mixture is reacted with formaldehyde.

According to U.S. Pat. No. 3,227,667, lignin is first reacted with phenol under acid conditions, whereafter the reaction product is reacted with formaldehyde under alkaline conditions. A Patent has been applied for in Sweden (Swedish Application No. 73024127) which discloses a method in which a quantity of formaldehyde is added in the first stage.

The disadvantage with these methods is the relatively complicated method of manufacture and the large quantity (more than half dry weight) of synthetic resin components (phenol + formaldehyde) required. Another disadvantage is that, from the adhesion aspect, the lignin molecules, which are from the start slightly too large, are made even larger. The result of this is that large quantities of lignin-phenol-formaldehyde resin must be used in order to obtain the desired properties of physical strength of the board material produced. In actual fact, with some of the aforementioned methods, the quantity of phenol + formaldehyde in the binding agents used has been greater than in board produced solely with pure phenol resins.

To illustrate the background of the present Application, the molecular size of an effective wood adhesive must be discussed. It is important that the molecules of the binding agent are neither too large nor too small. If the molecules are too small, then they penetrate the surface of the wood to an excessive extent and the proportion of the binding agent which remains between the two surfaces to be joined is too small for the purpose. When, for example, a mixture of phenol and formaldehyde (phenol-formaldehyde solution) which has not been precondensed is used as an adhesive, practically no binding effect is obtained at all. On the other hand, if the molecules are too large, the jointing surfaces are not sufficiently penetrated whereby the adhesion therebetween is not that desired. Consequently, the molecular weight of phenol adhesive for wood-glueing purposes lies between 200 - 300, while the sulphate lignin lies between 1000 and 2000. The mean molecular weight of lignosulphonates obtained from coniferous (softwood) wood is about 10,000.

A further undesirable property of the unmodified lignin with regard to adhesion is the tendency of the lignin molecules to lump together to form agglomerates of relatively low plasticity and the relatively few groups possessed by the lignin capable of cross-linking.

It has now been found that when the lignin, which is not directly suitable for use as a wood adhesive, is mixed with chemicals of low molecular weight which (1) are capable of swelling the agglomerate of lignin molecules, (2) impart additional cross-linking possibilities to the adhesive, (3) when pressing the glued joint surfaces together are capable of being pressed from the lignin to a certain extent and to penetrate the wood material at the joint surfaces and therewith form a bridge between wood substance and adhesive, there is obtained a fully satisfactory adhesive.

One such chemical is the previously mentioned mixture of phenol and formaldehyde, which in itself is completely unusable as an adhesive. The surprising fact is that if, for example, precipitated and air-dried sulphate lignin and a phenol-formaldehyde solution, which in itself affords no adhesive effect, are mixed together there is obtained an adhesive which exhibits excellent adhesion properties.

Accordingly the invention relates, in general, to a synthetic resin product which can be used, in particular, for the glueing of wood products and for the manufacure of shaped objects, said synthetic resin product comprising lignin and a low-molecular weight liquid substance which is capable of penetrating and swelling lignin and which can be reacted with lignin to form a hardened product, the liquid substance being physically absorbed in the lignin. Hardening of the lignin may be effected, for example, by heating the same to a suitable temperature or by admixing said lignin with a hardener which will cause hardening to take place at room-temperature or a moderately raised temperature.

In the present context the term "lignin" is not used solely with reference to lignin as such, but also, for example, with reference to lignosulphonates and similar lignin derivatives which possess substantially the same properties as lignin and which can react in the same manner with the liquid substance used in accordance with the invention. The lignin may be present in the form of a purified product, although crude lignin containing sugar and similar compounds may be used, for example, spray-dried sulphite waste liquor.

As previously indicated, a suitable liquid substance for use in accordance with the invention is a solution of formaldehyde in phenol, optionally in combination with an acid or alkaline hardener. Such a solution may be readily prepared by melting phenol and adding formaldehyde (for example in the form of paraformaldehyde). The mixing ratio of phenol to formaldehyde may vary as desired, depending upon the desired properties of the finished product, although this ratio generally lies between 3:1 and 1.5:1, preferably between 2.2:1 and 1.8:1.

The hardener used for the phenol-formaldehyde solution may be known acid and alkaline hardeners normally used for phenol aldehyde resins. Examples of acid hardeners include ammonium chloride and paratoluene sulphonic acid, while examples of alkaline hardners include sodium carbonate, sodium hydroxide and ammonium hydroxide. The hardener may be dissolved in the phenol formaldehyde solution or may be admixed with the lignin separately at the same time as the mixing of the solution. The solution is used generally in quantities of between 0.1 – 5%, preferably 1 – 2% calculated on the weight of the total synthetic resin product.

The synthetic resin product is prepared by simple mixing processes, suitably at room-temperature or a temperature slightly higher than room-temperature, in any event at a temperature which is so low that no substantial reaction takes place between the lignin and the solution. The lignin can be used in powder form, i.e. in the form of a purified precipitate from black liquor or in the form of a lignosulphonate recovered from sulphite waste liquor.

The lignin and the phenol-formaldehyde solution is mixed in proportions which may vary between 1:10 and 100:1, preferably between 1:1 and 10:1, depending upon the desired properties of the product. In the case of an adhesive, the mixing ratio is conveniently selected so as to obtain a paste-like consistency or a viscous consistency reminiscent of conventional glue. Suitable mixing proportions can be readily established empirically. Instead of ordinary phenol (i.e. hydroxybenzene) other phenols such as m- or p-cresol can be used. Similarly it is possible to substitute the formaldehyde with other aldehydes, such as furfural.

Instead of phenol and aldehyde, it is also possible to use other liquid substances capable of absorbing lignin and of reacting therewith, i.e. liquid substances which have the aforementioned properties.

When used as an adhesive, the synthetic resin product according to the invention is applied to the joint surfaces in the normal manner. When applying the product to chipboard, the adhesive is applied to the chips prior to the chips being pressed, in the form of a powder, a water-free liquid or a water-dispersion. The product is then heated, conveniently under pressure, to harden same. During heating of the product, the added liquid substance reacts with the lignin, and when, for example, a phenol-aldehyde solution is used, the components naturally react with each other. In addition, during the pressing operation part of the liquid substance will apparently be pressed out of the lignin and penetrate into the bonded surfaces, e.g. wood surfaces, thereby to form a bridge between said surfaces and the lignin, which results in the formation of a strong joint.

The product can also be used as a moulding compound for the production of moulded objects by pressure-moulding and similar methods, normally used for the manufacture of products from thermosetting resins.

The invention will now be ilustrated by means of an example.

EXAMPLE

Sulphate lignin was precipitated and purified in the following manner: The lignin was precipitated from black liquor with $H_2SO_4$ and filtered at 60° C. The precipitate (100 g) was purified from salts precipitated simultaneously therewith by slurrying the precipitate in water (100 ml) stirring and centrifuging the mixture and air-drying the same to a light-brown powder having a moisture content of 3.6%. The lignin thus produced had an ash content of 3.7% (absolutely dry).

A phenol-formaldehyde solution was prepared in the following manner: 100 g phenol were melted and heated to approximately 80° C. 50 g paraformaldehyde were added whilst stirring. After about 30 minutes all the paraformaldehyde had decomposed and dissolved in the phenol. The mixture was maintained at 80° C for a further 3 – 5 hours. In this way there was obtained a hardenable solution of low viscosity of formaldehyde in phenol at a mixing ratio of 1:2, said solution being clear even at room-temperature.

A lignin product which could be used as an adhesive was prepared in the following manner: 10 g of the sulphate lignin prepared in accordance with the above was admixed with 5 g of phenol-formaldehyde solution and 0.5 g $NH_4Cl$. This mixture was stirred for some minutes at room-temperature and obtained a consistency reminiscent of a normal plywood adhesive. The adhesive thus produced was used to glue a 2 mm pine veneer to a 10 mm chipboard. The pressing operation was maintained for 5 minutes at a temperature of 150° C and a pressure of 5 kg/cm². A good glue joint was obtained. When subjected to splitting tests a practically 100% wood fracture was obtained. Two pieces of veneer were tested with respect to their transverse strength in accordance with SIS 234801. In both bases fracture occurred at 5.44 and 5.72 kg/cm², respectively.

I claim:
1. A method of joining wood products together with an adhesive, comprising the steps of:
   mixing lignin with a solution consisting essentially of phenol and a compound selected from the class consisting of formaldehyde and a substance yielding formaldehyde at a low temperature such that no substantial reaction takes place so that said phe- nol and said formaldehyde are absorbed by said lignin, applying said lignin-phenol-formaldehyde mixture to the wood surfaces of said wood products to be joined, and reacting said phenol and said formaldehyde with said lignin by heating so that a hardened lignin adhesive joins said wood products.

2. A method as claimed in claim 1 wherein the liquid substance comprises a solution of formaldehyde in phenol containing an acid or an alkaline hardener.

3. A method as claimed in claim 2 wherein the mixing ratio lignin/phenol-formaldehyde solution is between 1:10 and 100:1.

4. A method as claimed in claim 2 wherein the mixing ratio phenol to formaldehyde in the phenol-formaldehyde solution is between 3:1 and 1.5:1.

5. A method as claimed in claim 2 wherein the acid hardener comprises ammonium chloride, paratoluene sulphonic acid or the like and constitutes between 0.1 – 5% of the weight of the lignin product.

6. A method as claimed in claim 2 wherein the alkaline hardener comprises sodium carbonate, sodium hydroxide, ammonium hydroxide or the like, and constitutes between 0.1 – 5% of the weight of the lignin product.

7. A method as claimed in claim 3 wherein said mixing ratio of said lignin to said phenol-formaldehyde is between 1 to 1 and 10 to 1.

8. A method as claimed in claim 4 wherein said mixing ratio of said phenol to said formaldehyde in said phenol-formaldehyde solution is between 2.2 to 1 and 1.8 to 1.

9. A method as claimed in claim 5 wherein said amount of said acid hardener constitutes from 1 to 2% by weight of said lignin adhesive.

10. A method as claimed in claim 6 wherein said alkaline hardener constitutes 1 to 2% by weight of said lignin adhesive.

* * * * *

UNITED STATES PATENT OFFICE
CERTIFICATE OF CORRECTION

Patent No. 4,113,542  Dated September 12, 1978

Inventor(s) Ingvar Johansson

It is certified that error appears in the above-identified patent and that said Letters Patent are hereby corrected as shown below:

Column 1, line 18, before "Danish", insert -- ( --

Column 3, line 1, change "cure" to -- cture -- to complete the word "manufacture" from column 2, line 68.

Signed and Sealed this

Sixth Day of March 1979

[SEAL]

*Attest:*

RUTH C. MASON
*Attesting Officer*

DONALD W. BANNER
*Commissioner of Patents and Trademarks*